D. J. SIMPSON.
STEEL TREATMENT TRANSFERRING SYSTEM AND APPARATUS THEREFOR.
APPLICATION FILED APR. 5, 1915. RENEWED DEC. 29, 1919.

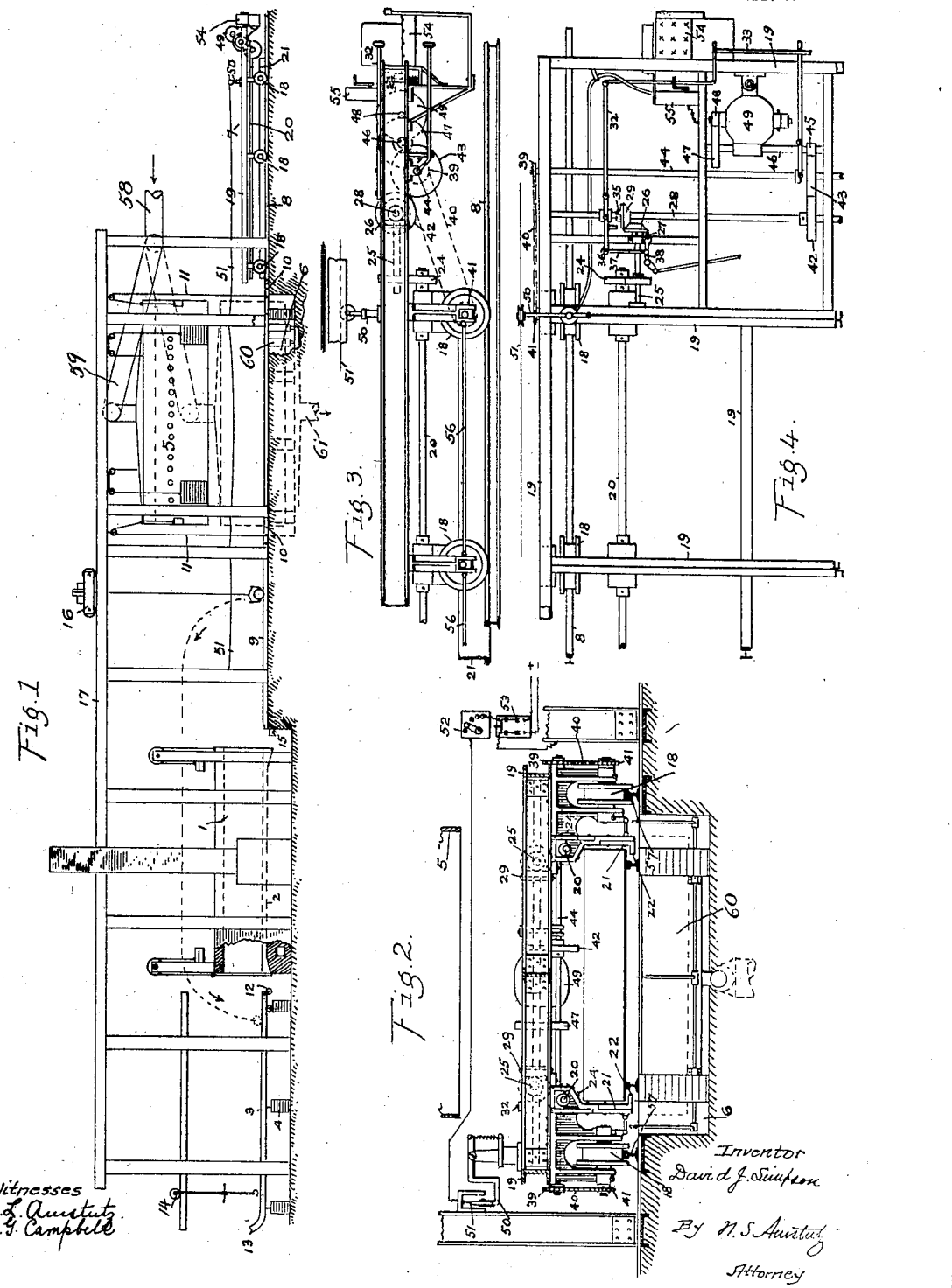

1,348,903.

Patented Aug. 10, 1920.
3 SHEETS—SHEET 2.

D. J. SIMPSON.
STEEL TREATMENT TRANSFERRING SYSTEM AND APPARATUS THEREFOR.
APPLICATION FILED APR. 5, 1915. RENEWED DEC. 29, 1919.
1,348,903.
Patented Aug. 10, 1920.
3 SHEETS—SHEET 3.
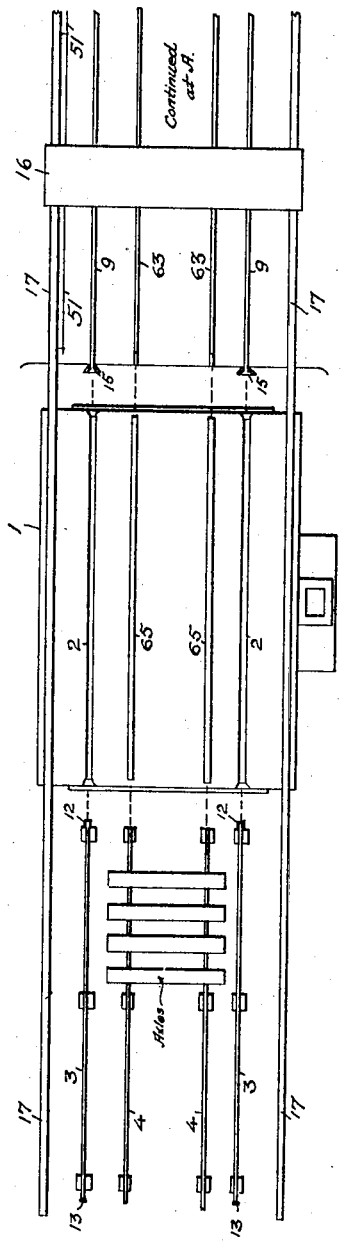
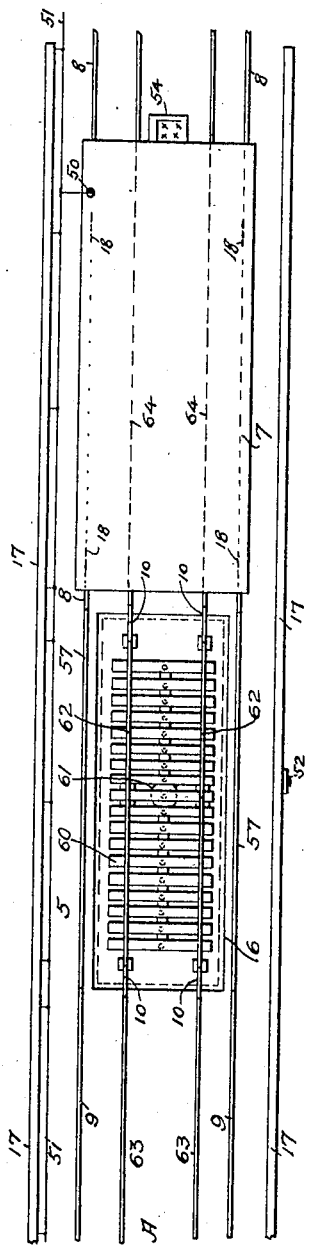
Fig. 10.
David J. Simpson Inventor
By N. S. Amstutz
Attorney

UNITED STATES PATENT OFFICE.

DAVID J. SIMPSON, OF CHICAGO, ILLINOIS, ASSIGNOR TO NOAH STEINER AMSTUTZ, OF VALPARAISO, INDIANA.

STEEL-TREATMENT-TRANSFERRING SYSTEM AND APPARATUS THEREFOR.

1,348,903.      Specification of Letters Patent.      Patented Aug. 10, 1920.

Application filed April 5, 1915, Serial No. 19,312. Renewed December 29, 1919. Serial No. 348,051.

*To all whom it may concern:*

Be it known that I, DAVID J. SIMPSON, a citizen of the United States, residing at Chicago, in the county of Cook and State of Illinois, have invented certain new and useful Improvements in Steel-Treatment-Transferring Systems and Apparatus Therefor, of which the following is a specification.

My invention relates to improvements in steel treatment transferring apparatus and it relates more especially to the features hereinafter pointed out in the annexed claims.

The purpose of my invention is to provide a transferring system which will insure the most rapid removal of materials from a furnace to a cooling chamber so as to retain the highest grade of output produced by specialized heat treatments; to insure a uniformity of quality through a speedy transfer of the hot material to a cooling agency whose degree of activity is controllable; to provide for the handling of large units or groups of material; to avoid the uncertainties of quenching; to produce a higher grade of product more certainly and economically than has heretofore been attainable.

With these and other ends in view I illustrate in the accompanying drawings such instances of adaptation as will disclose the broad features without limiting myself to the specific details shown.

Figure 1— Is a side elevation more or less diagrammatic of an adaptation of the invention showing the storage space at the left, the heating furnace, the intermediate storage space, the heat treatment apparatus and the storage space beyond.

Fig. 2— Is an end elevation of a transfer buggy on its tracks while standing above the treatment pit, also showing the electrical connections for its control.

Fig. 3— Is an enlarged side elevation of the motor end of the buggy.

Fig. 4— Is a plan view of Fig. 3.

Figure 5:
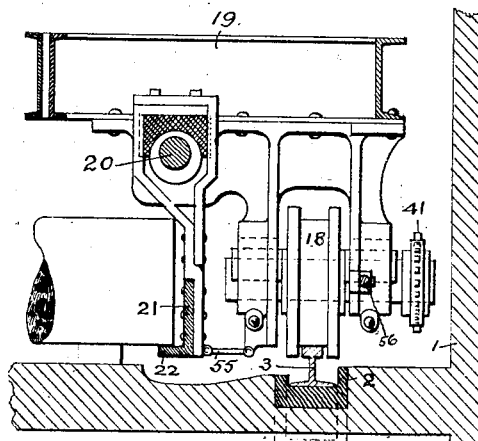

Fig. 5— Is an enlarged transverse elevation partly in section showing one half of the buggy adaptation for raising and lowering the axles.

Figure 6:
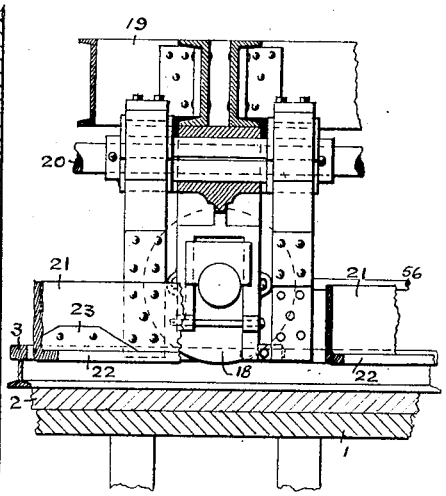

Fig. 6— Is a side elevation of Fig. 5 partly in section.

Figure 7:
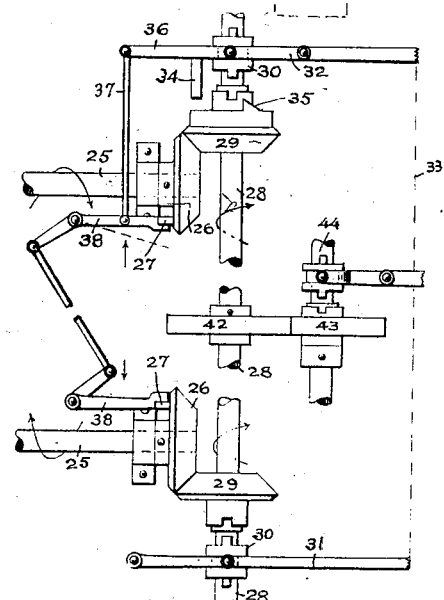

Fig. 7— Is an enlarged diagrammatic plan view showing the mechanism for controlling the raising and lowering of the axles and the movement of the buggy.

Figure 8:
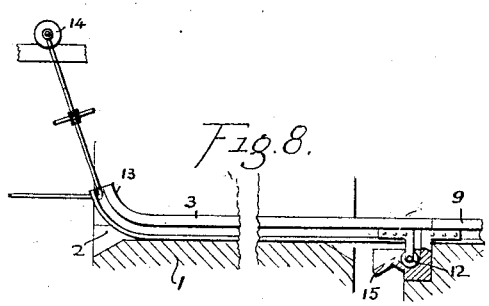

Fig. 8— Is a diagrammatic elevation showing a removable track rail placed in the heating furnace and extending beyond the same so as to connect the permanent tracks of the heat treatment apparatus with the removable tracks of the furnace.

Figure 9:
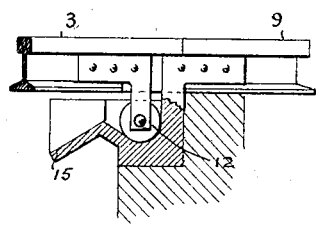

Fig. 9— Is an enlarged elevation of the joining end of a removable furnace rail.

Fig. 10— Is a diagrammatic plan view of the furnace, cooling chamber and related storage and transfer tracks in two parts the lower being a continuation of the upper.

In successfully carrying out the heat treatment of carbon or analogous steels it is of the utmost importance to dissipate the heat of the treatment as rapidly as possible without setting up internal stresses or deteriorating the granular structure secured by such treatments. Where a large volume of material is to be handled the necessity for a rapid transfer from one place to another is especially urgent. Of course it is immaterial whether the steel products be axles or other articles. If they include small detached articles they may be held in groups in any suitable manner and transferred bodily the same as in the case of axles.

The instance of adaptation shown is specially applicable to the raising of a large number of units simultaneously and transferring them in a single load. The buggy instead of lifting round sections bodily might have vertical spacing bars attached to swinging plates so that the bars would come between the sections and allow them to roll along on the tracks from one place to another.

It is practically impossible to manually roll a large number of hot sections from the furnace to the cooling chamber in the required time because of their tendency to not roll straight, due to slight differences in diameter of their ends. As the sections are commonly hammered it is impossible to insure exactness of diameter. Furthermore, the transfer of a large 12″ diameter section while hot is not an easy thing to do with pinch bars as each section may weigh a ton, more or less.

The furnace 1 may be of any desired type. It has the usual bars on which the material or material holders are placed so as to allow underneath circulation. Counterweighted vertically sliding doors are placed at each end. Track grooves 2 are formed in the floor. These may be lined with fireproof cement so as to protect the adjacent fire brick. A removable rail 3 is pushed into each groove so as to permit the buggy 7 to enter the furnace to remove the heat treated steel. It may be charged from either end, by hand or with the buggy.

Ordinarily sufficient time can be taken to roll the cold sections into the furnace without resorting to bulk loading. Should however it be found desirable to expedite this the motor of the buggy could be insulated against the external heat so as to pass through the furnace to the cold steel storage 4 where it could be loaded, moved to the furnace, unloaded and removed toward the cooling chamber until the heat was completed when the rails 3 would be reinserted and the "charge" taken as speedily as possible to be cooled. The details of this cooling apparatus and related devices are made the subject of a separate application.

The cooling chamber is inclosed by a hood 5 which may be raised and lowered at will. Its bottom edges are sealed off by a suitable liquid in tank 6. An isolated supporting trackage is placed in the center of the tank upon which the material to be cooled is deposited. Beneath the track suitable cooling agent variable exits are placed, which with a controlled inlet to hood 5 insure a rapid radiation of heat and a uniform quality of product. Air is admitted to the hood 5 through a central pipe shown in Fig. 1. This pipe in turn is connected to a jointed section of pipe 59 that is attached to a main supply pipe 58. When the hood is lowered, the air is withdrawn through chambers 60 placed transversely of the tank 6. All of these chambers are connected to a common exit 60.

The buggy 7 after a load has been deposited under hood 5, is moved from beneath it to trackage 9 having passed from furnace 1 over tracks 9 and over tank 6. As soon as the hood 5 is lowered hinged track sections 10 connecting the material supports 62 of the tank 6 with storage rails 63 are automatically raised through cables 11 passing over suitable sheaves while attached to the hood. In this way the tracks are removed at each end of the tank to allow the hood to be lowered into it.

The rails 62 and hinged sections 10 are only used when axles are moved by hand from storage rails 63 to supports 62 or from the latter to storage rails 64 beyond the tank 6, in case of emergencies, or when only a few axles are to be specially handled at one time.

The furnace rails 3, have wheels 12 and bent-up outer ends 13. They lie on any kind of support while out of the furnace. The rear end is attached to a traveling hoist 14. One of these may be provided for each rail, or both rails may be lifted at one time by a single hoist and track. The grooves 2 at each end of the furnace may be inclined so as to facilitate the insertion and removal of rails 3. The rails are alined with tracks 8 by means of beveled guides 15 which have suitable pockets for the rail wheels to rest in. On withdrawing the rail the wheels simply ride out of their pockets and up into and through the grooves 2.

In case any of the steel which has been cooled requires retreatment it may be manually removed from the supports 62 beneath hood 5 to trackage 63 and deposited from where overhead crane 16 movable on elevated structure 17 may transfer it across the top of the furnace to storage space 4 from where it can subsequently be replaced into the furnace. As soon as trackage 63 is emptied the buggy can be brought to the furnace and when the retreatment is completed and rails 3 have been inserted in grooves 2 the charge can be withdrawn and transferred to the cooling chamber 6 by the buggy. In this way two separate batches of material can be handled without interference. This traverse is shown in dotted lines of Fig. 1.

The buggy 7 is supported on suitable wheels 18, placed on each side and underneath a frame 19, on which eccentric lifting shafts 20 are supported. From the eccentrics of these shafts lifting bars 21 are suspended in any suitable manner. These have toes 22 on which distance blocks 23 Fig. 6 are secured to separate and approximately space the axles. Both of the eccentric shafts 20 are operated in unison so as to make a half revolution and then stop automatically. This is accomplished by means of gears 24 meshing with gears on short parallel shafts 25. These in turn have bevel gears 26 and each carries an interlocking pin or stop 27.

The main drive shaft 28 carries loose bevel gears 29 both engaged by clutches 30 which are operated by levers 31 that are joined together by a connection 33 on which a suitable handle may be secured. Lever 32 has a projection 34 that engages throw-off cam 35 and it has an extension 36 to which a link 37 is pivoted. This link is connected to two interlocking arms 38 which coöperate with pins 27 so as to prevent any "over run" of eccentric shafts 20. This arrangement of parts automatically throws clutches 30 out of action at the end of a half revolution of shafts 20 raising or lowering the material as desired.

Shaft 44 at its outer ends carries sprocket wheels 39 that connect by chain 40 to sprockets 41 on drive wheel 18. A gear 42 on shaft 28 meshes with gear 43 on intermediate shaft 44 thus keeping the main drive shaft in continuous rotation and carrying clutch parts 30 with it ready for immediate use. Gear 43 also meshes with pinion 45 on motor reduction shaft 46 which in turn carries gear 47 through which pinion 48 connects to the armature of motor 49. A suitable clutch on shaft 44 serves to connect and disconnect the gear 43 to the shaft so as to start and stop the buggy.

A suitable trolley arm 50 contracts with an inclosed trolley wire 51 secured to the posts of elevated structure 17 out of line with the hood movement. In case the buggy is to be controlled from a stationary point, starting box 52 may be combined with a main switch and fuses 53. Should however it be desired to control its movement from the buggy itself a suitable operator's seat 54 and adjacent controller 55 may be placed near the motor end of the buggy. Should it be found desirable the motor may be placed beneath the frame 19 and held in spring suspensions if needed as is common in street railway practice and as this specific feature is old and well known it is not shown.

In order that the lifting bars 21 may not sway sidewise and be found out of position with respect to the ends of the axles as eccentric shafts 20 raise and lower them, suitable links 55 connect the bars 21 to adjacent wheel supports of the main frame as shown in Fig. 5. The different supports for wheels 18 are tied together by links 56 shown in Fig. 3. In order that the traverse of the buggy will not interfere with the axle supporting rails 63 which rest on pedestals in the tank of the heat treating apparatus, track rails 57 are placed along each side of the tank and when the buggy is not used during any emergencies that may arise hinged rails similar to sections 10 may be placed in alinement with the axle supporting rails which may be used to temporarily bridge the hood space and permit of axles being rolled into place by hand. In such exigencies rails 63 would be laid between the buggy rails 57 in the storage space between the furnace and heat treatment chamber.

What I claim is,

1. A furnace, closable openings at both ends, storage supports at one end, transferring tracks at the other end, removable rails adapted to be inserted and withdrawn from the furnace, and means for automatically guiding the entering end of such rails through the furnace and into alinement with the transfer tracks.

2. A furnace, grooves within the floor thereof serving as retaining recesses and as guides, removable track rails adapted to rest therein, transfer tracks beyond and disconnected from the furnace, and means for inserting the rails in said grooves and automatically alining one end thereof with the transfer trackage when required to discharge the furnace.

3. A furnace, rail grooves formed in the floor thereof, removable rails adapted to rest in said grooves, a suitable wheel for one end of each of the rails, a traverse hoist attached to the other end, transfer tracks disconnected from the furnace, and means for guiding the rails into alinement and supporting the same by the transfer tracks.

4. In steel treatment transferring apparatus, a furnace, a buggy adapted to transfer articles from the furnace, tracks for the buggy outside of the furnace, removable rails placed within the furnace, and means for holding the said rails in alinement with the tracks so as to permit the buggy to pass into and out of the furnace as desired.

5. In steel treatment transferring systems, a furnace open at both ends, a transfer buggy adapted to pass into the furnace, tracks for the buggy leading to the furnace, removable buggy rails within the furnace, means for holding such rails in alinement with the tracks when the buggy is to pass into and out of the furnace.

6. In steel treatment transferring apparatus, a furnace, a buggy adapted to transfer articles from the furnace, removable rails within the furnace, tracks for the buggy external of the furnace, means for holding the rails in alinement with the tracks, and elevating means carried by the buggy adapted to raise the entire contents of the furnace at one time and after the buggy has been withdrawn from the furnace simultaneously lower the same.

In testimony whereof I affix my signature in presence of two witnesses.

DAVID J. SIMPSON.

Witnesses:
 F. W. AMSTUTZ,
 A. L. AMSTUTZ.